United States Patent [19]

Suefuji et al.

[11] Patent Number: 4,603,556
[45] Date of Patent: Aug. 5, 1986

[54] CONTROL METHOD AND APPARATUS FOR AN AIR CONDITIONER USING A HEAT PUMP

[75] Inventors: Kazutaka Suefuji; Hiromu Yasuda; Masakatsu Hayashi; Tetsuya Arata; Kensaku Oguni; Shigeaki Kuroda, all of Shimizu; Akira Atsumi, Niihari; Kyuhei Ishibane, Shimizu; Hirokiyo Terada, Shizuoka; Takao Senshu, Niihari; Hiroshi Kogure, Sano, all of Japan

[73] Assignee: Hitachi, Ltd., Tokyo, Japan
[21] Appl. No.: 709,718
[22] Filed: Mar. 8, 1985

[30] Foreign Application Priority Data

Mar. 9, 1984 [JP] Japan ............................ 59-44896

[51] Int. Cl.⁴ ............................................. F25D 17/00
[52] U.S. Cl. ........................................ 62/180; 62/228.4
[58] Field of Search ............... 62/160, 180, 228.4, 62/228.5, 186, 203, 208, 209, 215, 213; 165/16, 29; 236/91 F, 78 B, 49

[56] References Cited

U.S. PATENT DOCUMENTS

| | | | |
|---|---|---|---|
| 3,917,161 | 11/1975 | Nielsen | 236/49 X |
| 4,269,261 | 5/1981 | Kountz et al. | 62/160 X |
| 4,364,237 | 12/1982 | Cooper et al. | 62/160 |
| 4,509,586 | 4/1985 | Watabe | 62/213 X |

Primary Examiner—Harry Tanner
Attorney, Agent, or Firm—Antonelli, Terry & Wands

[57] ABSTRACT

The present invention is characterized by selecting, during heating, the hot air blowing mode in which a compressor and a blower for an indoor heat exchanger are each controlled as to r.p.m. to control the temperature of outlet air blown from an air conditioner at a higher temperature, and the normal mode in which the room temperature is controlled. Also, as required, an air passage of the outlet is set to be narrow to blow hot air in a confined space, or the air passage of the outlet is set wide to disperse warm air during normal operation.

12 Claims, 16 Drawing Figures

CONTROL METHOD AND APPARATUS FOR AN AIR CONDITIONER USING A HEAT PUMP

BACKGROUND OF THE INVENTION

The present invention relates to an air conditioner using a heat pump, and more particularly to a heat pump air conditioner which has good starting characteristics for heating.

The prior art will be explained by referring to FIG. 1. In FIG. 1, designated at reference numeral 1 is a compressor, 2 a four-way valve, 3 an outdoor heat exchanger, 4 an indoor heat exchanger, 5 an expansion valve (or decompression device), 6 an electric motor to drive the compressor, 7 an inverter to change the r.p.m. of the electric motor 6, 8 a blower for the outdoor heat exchanger (including an electric motor for the blower), 9 a blower for the indoor heat exchanger (including an electric motor for the blower), 11 a sensor for detecting the temperature of air flowing into the indoor heat exchanger (i.e., room temperature), 12 a setting unit to set the desired temperature, 13 a temperature comparator to compare the temperature detected by 11 and preset by 12, and 17 is a controller to send an instruction to the inverter 7 based on the results from the comparator 13.

The prior art thus constructed is intended to change r.p.m. of the compressor 6 only with the inverter 7 (while keeping the r.p.m. of the indoor blower high and constant to increase the efficiency of refrigeration cycle in air conditioning), and to compare the temperature from the sensor 11, which detects the temperature Tai of air flowing into the indoor heat exchanger (hereinafter referred to as room temperature), with the temperature preset by the setting unit 12, so that the room temperature is made equal to the preset temperature, thus changing the amount of radiant or absorbed heat through the indoor heat exchanger, thereby producing a comfortable environment in the room. However, those areas in which the heating load during winter is larger than the air cooling load during summer present a problem in that, even with the prior art for controlling the room temperature to bring it to the preset temperature at the starting of heating, it takes time until the occupants of the room start to feel comfortable. They feel rather uncomfortable at the starting of the heating operation. This results from the fact that the prior art has been directed to a system for just sending heat into the room to increase the room temperature without taking into account the effect of air flowing in the room upon thermal comfort and the effect of radiation from walls.

The present invention aims to provide a heat pump air conditioner which can produce a comfortable environment for the occupants of room, particularly those who are directly subjected to blown air, even during a large heating load such as at the start of heating.

SUMMARY OF THE INVENTION

To achieve the foregoing object, the control system of the present invention comprises; a coolant circuit including a compressor, a four-way valve, an indoor heat exchanger, an expansion valve and an outdoor heat exchanger connected through piping in sequence; a variable speed electric motor for the compressor; a variable speed blower for the indoor heat exchanger; means for detecting the temperature of air (hereinafter, referred to as inlet air) drawn into an air conditioner and means for presetting the desired temperature (or setting temperature) of the air that has been drawn in; means for detecting the temperature of blown air (hereinafter referred to as outlet air) and means for presetting the desired higher temperature of the outlet air; a control system in normal operation in which the r.p.m. of the compressor is controlled so that the temperature of the inlet air from the indoor side is made equal to the preset temperature thereof and the hotter air blowing operation mode in which the r.p.m. of the blower for the indoor heat exchanger is controlled while keeping the r.p.m. of the compressor high so that the temperature of the outlet air on the indoor side is made to equal the higher preset temperature thereof, both operation modes being changed so as to control the environment in the room.

In addition to the above, the present invention is also characterized in that an air passage of the hot air outlet is set to be narrow together with the foregoing control to blow hot air onto a restricted area during the hot air blowing mode, and the air passage of the hot air outlet is set to be wide together with the foregoing control to disperse warm air throughout the room during normal operation.

DETAILED DESCRIPTION OF PREFERRED EMBODIMENT

Figure 2:
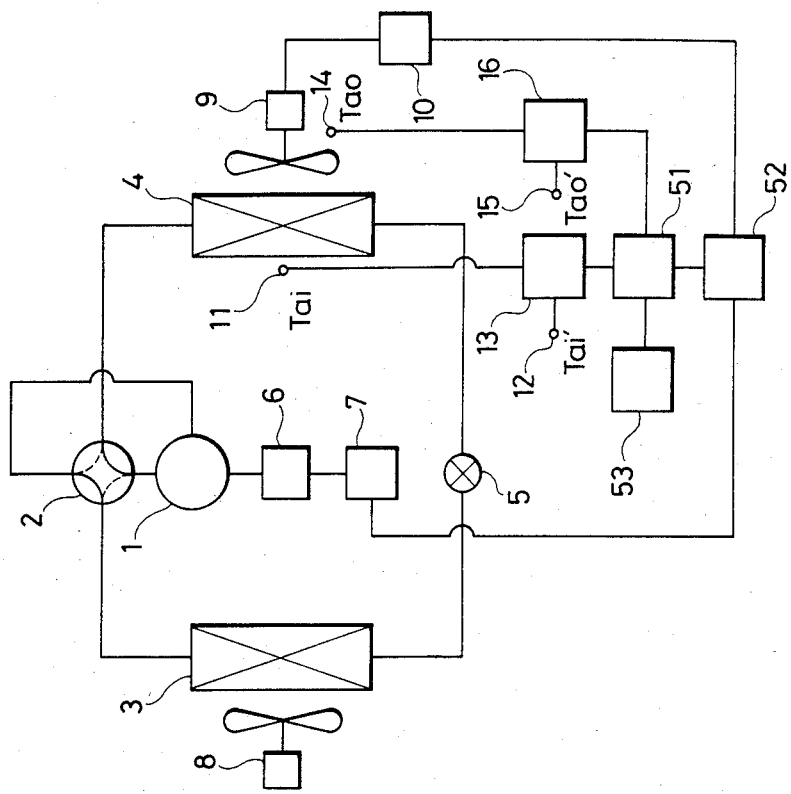
FIG. 2 is a block diagram showing the schematic diagram of an apparatus according to one embodiment of the present invention.

Hereinafter preferred embodiments of the present invention will be described by referring to the drawings.

FIG. 2 shows one embodiment of the present invention. In the figure, designated at reference numeral 1 is a compressor, 2 a four-way valve for inverting the direction of flow in a coolant circuit, 3 an outdoor heat exchanger, 4 an indoor heat exchanger and 5 is an expansion valve (or decompression device), these components being connected through piping to thereby form a coolant circuit. Furthermore, designated at 6 is an electric motor for driving the compressor, 7 an inverter for changing the r.p.m. of the electric motor 6, 8 a blower for the outdoor heat exchanger (including an electric motor), 9 a blower for the indoor heat exchanger (including an electric motor), 10 a device for changing the r.p.m. of the indoor blower, 11 a sensor for detecting the temperature of inlet air flowing into the indoor heat exchanger, 12 a setting unit for setting the desired air temperature, 13 a temperature comparator which senses the difference between temperatures detected by the sensor 11 and preset by the setting unit 12, 14 a sensor for detecting the temperature of outlet air blown into the room after said air has passed through the indoor heat exchanger, 15 a setting unit for presetting the desired higher temperature of the air, 16 a temperature comparator between the temperatures detected by the sensor 14 and preset by the setting unit 15, 51 an arithmetic unit for calculating rpm changes to be sent to the rpm changing device 10 and the inverter 7 based on the results of comparison by the temperature comparators 13 and 16, 52 rpm changing means for applying rpm change instructions to the rpm changing device 10 and the inverter 7 in accordance with the instruction from the arithmetic unit 51, and 53 is the mode switching means.

Figure 3:
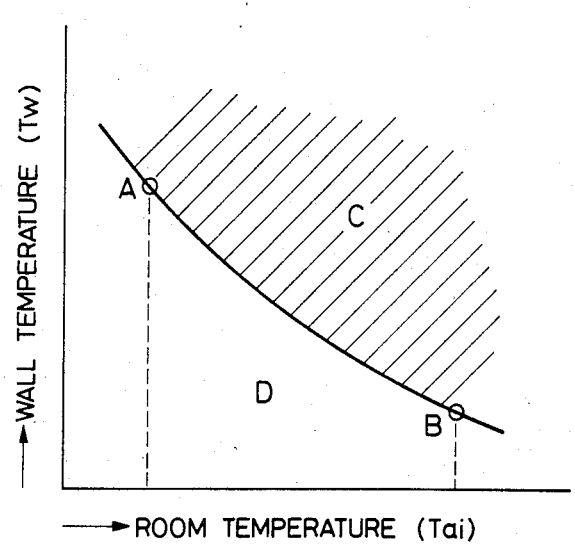
FIG. 3 is a graph showing how comfort depends on the relationship between room temperature and wall temperature.

Because the essential point of the present invention is directed to an improvement in heating operation characteristics of a heat pump air conditioner, description of the operation during air-cooling is omitted and only the operation during heating will be described below. In FIG. 2, the four-way valve 2 is turned over such that the coolant is circulated in the direction to heat a room, with the coolant absorbing heat through the outdoor heat exchanger 3 and radiating heat through the indoor heat exchanger 4 to thereby heat the room. At this time, if the heating load is relatively small and the temperature of walls defining the space to be air conditioned is not too low, the room temperature is adjusted in such a manner, as described in the prior art, that the r.p.m. of the compressor 1 only is changed while keeping high and constant a quantity of blown air from the indoor heat exchanger, whereby the temperature detected by the sensor 11 is controlled so as to be made equal to the preset temperature 12. Such a system will be referred to as the normal operation mode. Conversely, when the temperature of walls defining a space to be air conditioned is low as is often the case at the start of heating in winter, even if heat is sent into the room to warm the ambient air, a rise in the wall temperature requires substantial time, so that it takes some time until the occupants of the room begin to feel warm due to the effect of heat radiation from the wall surfaces, thus resulting in an uncomfortable environment. In this case, the temperature of outlet air blown into the room through the indoor heat exchanger 4 needs to be raised up to a sufficiently high level from the standpoint to make comfortable environment. This relationship will be described by referring to a comfort curve in FIG. 3. FIG. 3 shows radiation temperature of walls Tw, room temperature Tai and a comfort curve AB at which the occupants of the room feel comfortable. The region C above the curve AB represents a region in which the occupants of the room feel warm or hot, while the region D under the curve AB represents a region in which the occupants of the room feel cool or cold. As will be understood from the figure, the room temperature Tai may be relatively low with the wall temperature Tw at a higher level, but the room temperature Tai or the temperature of outlet air blown from the air conditioner needs to be increased when the wall temperature Tw is at a lower level.

This embodiment includes the hot air blowing mode which blows hot air during heating, in addition to the conventional mode, and these modes can be selected by the switching means 53.

Hereinafter a practical example of the hot air blowing mode will be described and this embodiment will be explained in more detail.

Figure 4:
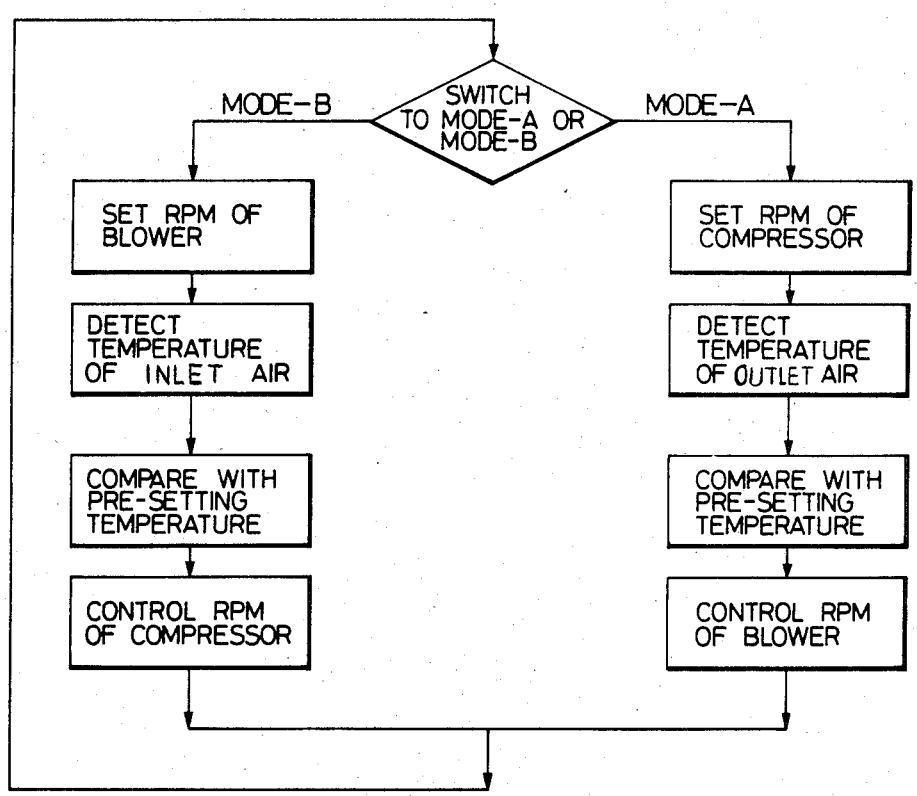
FIG. 4 is a flowchart showing the control process for one embodiment of the present invention shown in FIG. 2.

FIG. 4 is a flowchart showing the operation of the embodiment using the air conditioner constructed as shown in FIG. 2. When it begins to operate, the switching means 53 sets the hot air blowing mode (hereinafter referred to as mode A) or the normal mode (hereinafter referred to as mode B). With mode A set, the arithmetic unit 51 sets the r.p.m. of the compressor at the maximum value, and it is decided whether or not the outlet air temperature detected by the sensor 14 has reached the preset temperature. If it has not yet reached the preset temperature, the r.p.m. of the blower 9 decreases and, if it has already reached the preset temperature, the r.p.m. of the blower 9 increases. Namely, the quantity of outlet air is controlled by the r.p.m. changing means 52 so that the outlet air temperature is made to equal the preset temperature. Conversely, when mode B is set by switching means 53, the r.p.m. of the blower is held at the maximum value, and the r.p.m. of the compressor is controlled by the arithmetic logic unit 51 and the rpm changing means 52 so that the temperature detected by the room temperature sensor 11 is made to equal the preset temperature set by the setting unit 12. The more detailed operation of this embodiment will be described by referring to FIG. 5.

Figure 5:
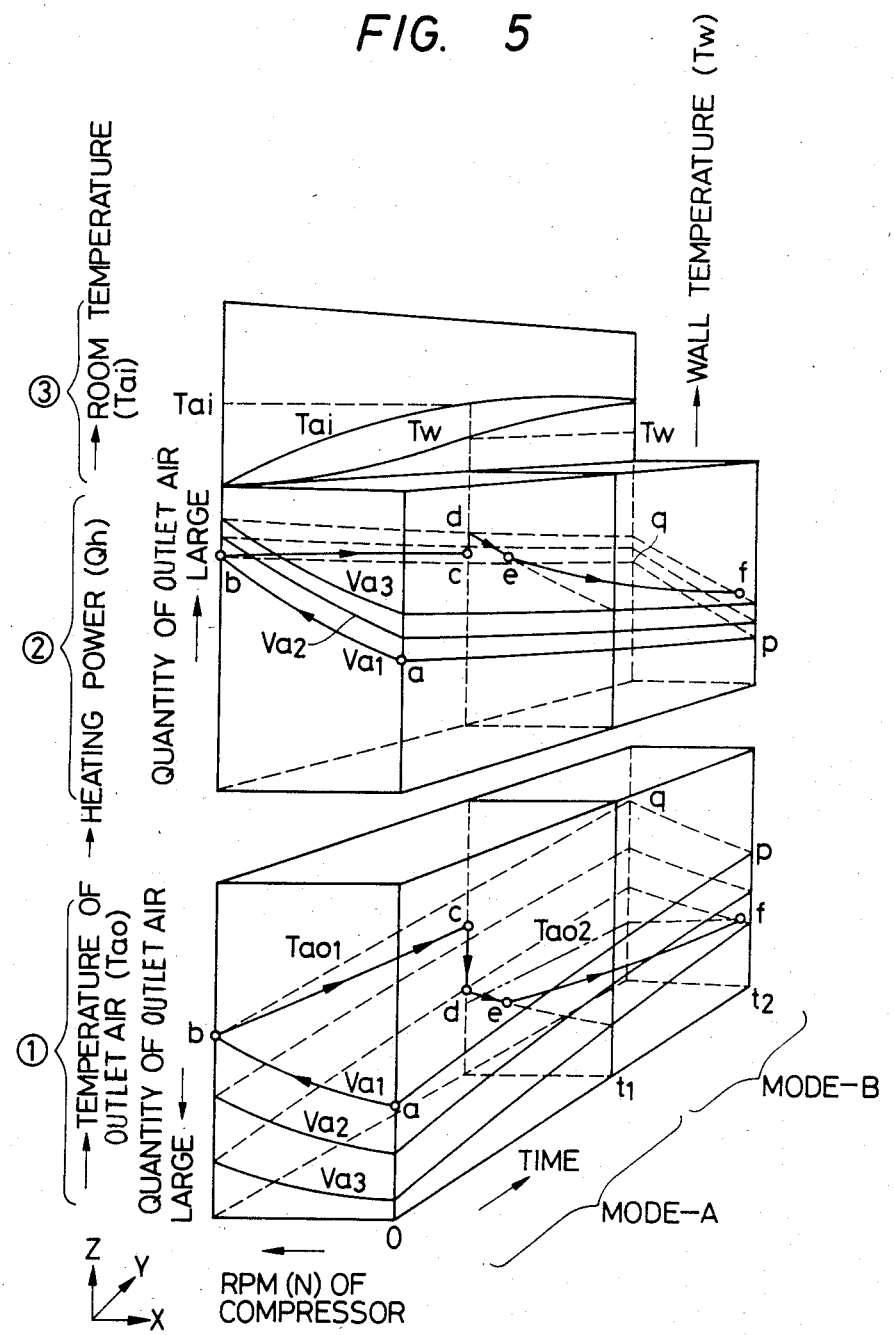
FIG. 5 is a graph for explaining the operation of the above embodiment of the present invention.

In FIG. 5, the X-axis designates the rpm N of the compressor, the Y-axis designates a time base, and the Z-axis designates the outlet air temperature Tao in the section ①, heating power Qh in the section ② and the room temperature Tai as well as the wall temperature Tw in the section ③. There are shown heating characteristics of an air conditioner installed within a particular building with a quantity of outlet air from the blower for the indoor heat exchanger as a parameter. In the figure, planes Va1, Va2 and Va3 represent such characterstics with the corresponding quantities of outlet air constant (Va3>Va2>Va1). For example, when the r.p.m. is increased with a constant quantity of outlet air corresponding to the plane Va1, the characterstics of the air conditioner are represented by curves shown at a→b such that the outlet air temperature Tao and the heating power Qh are indicated in the sections ①and ②, respectively. When looking at variations along the time base with the number of revolutions N of the compressor and the quantity of outlet air being both held constant, Tao increases and Qh decreases as shown at a→p, b→q. This results from the fact that the air temperature within the building is gradually raised as heating proceeds. Thus, actual variations in the operational situation can be indicated in FIG. 5.

Therefore, there is shown in FIG. 5 a situation such that the operation is carried out in mode A at the start of heating, then switched over to mode B at time t1. First, the r.p.m. of the compressor is set to maximum from the start of heating to decrease the quantity of outlet air (a→b). Next, while maintaining the r.p.m. of the compressor, the quantity of outlet air is controlled so as to maintain Tao at the presetting temperature Tao1 (b→c). At the time t1, the operation is shifted to mode B to thereby switch over from outlet air temperature control to room temperature control (c→d→e). In mode B, the r.p.m. of the compressor is controlled while maintaining the quantity of outlet air at a maximum (e→f). Time-dependent changes of the room temperature Ta1 and the wall temperature Tw in the above process are shown in the section ③. Although, as indicated in the section ②, the heating power Qh during the mode A operation is slightly lowered as compared with the power of the air conditioner available at the maximum quantity of outlet air due to a reduction in the quantity of outlet air, this can be overcome by using means which is adapted to reduce the heating load by restricting the direction of flow of outlet air to heat the restricted space instead of heating the entire space to be air conditioned.

As described hereinabove, since the present invention blows hot air when the wall temperature Tw is low and the heating load is large, and controls the room temperature when the wall temperature has been increased and the heating load has become small, it ensures air conditioning which creates a comfortable environment for the occupants of the room.

Figure 1:
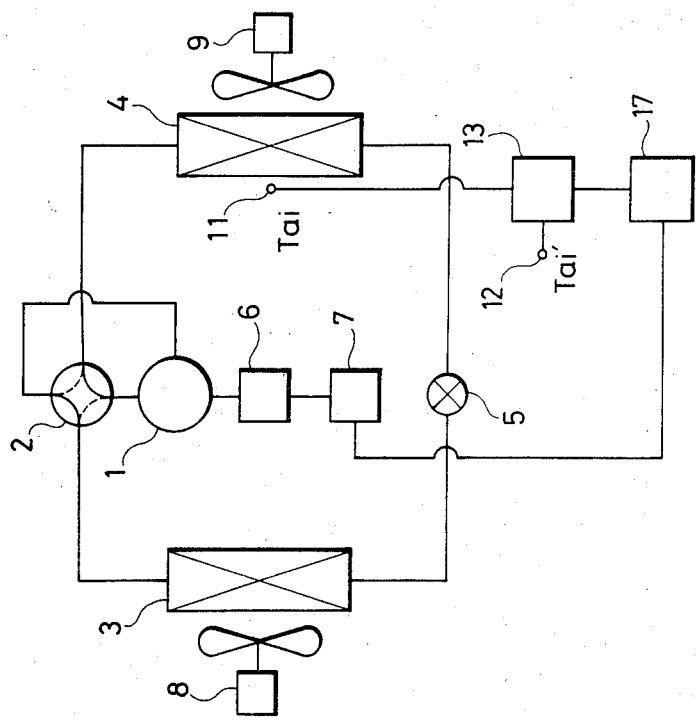
FIG. 1 is a block diagram showing the schematic diagram of an apparatus according to the conventional embodiment.
Figure 6:
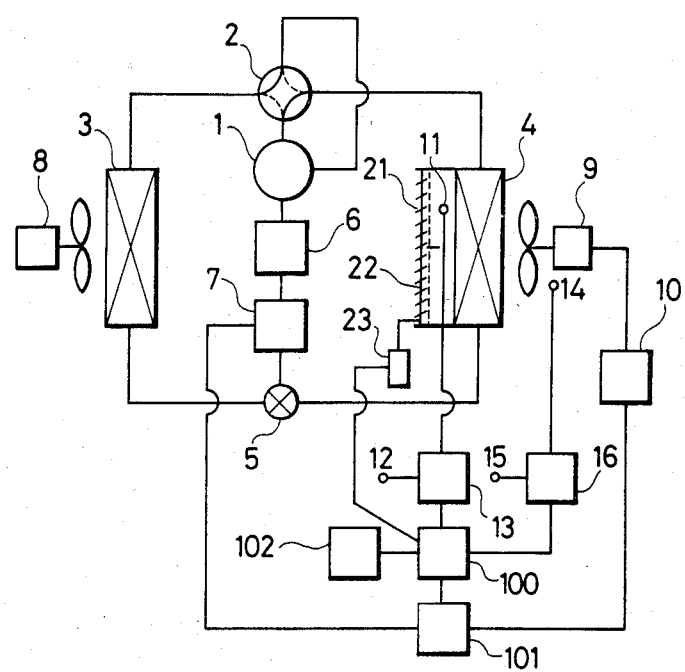
FIG. 6 is a block diagram showing the schematic diagram of an apparatus according to another embodiment of the present invention.

FIG. 6 is a block diagram showing another embodiment of the present invention. In the figure, designated by reference numeral 21 are air deflecting plates at the bottom outlet of the air conditioner, 22 movable air deflecting plates at the side outlet of the air conditioner, 23 is a driver for the movable air deflecting plates, 100 an arithmetic unit for making an arithmetic operation similar to that made by the arithmetic unit 51 of FIG. 1 based on the results of the both temperature comparators 13 and 16, 101 rpm change instruction means for sending rpm change instructions to the rpm changing device 10 and the inverter 7, in accordance with instructions from the arithmetic logic unit 100, and 102 is the mode switching means. Note that other components are designated at the same numerals because of their similarity to those shown in FIG. 2; therefore, the description thereof will be omitted.

Figure 7:
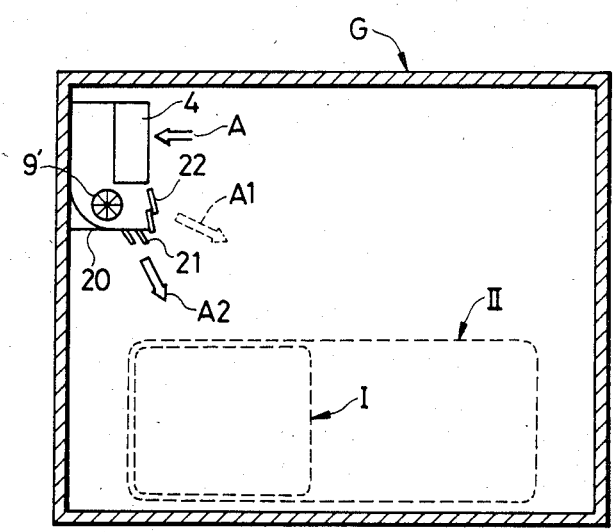
FIG. 7 is a view for explaining the manner of blowing effected by an air conditioner in the above embodiment.

This embodiment of the present invention includes, similar to the foregoing, a hot air blowing mode which blows hot air during heating, as well as the normal mode. These modes can be selected by the switching means 102. At the same time, in the hot air blowing mode, it is also possible to set the air passage of the outlet to be narrow, thereby blowing hot air to a restricted area. The construction of this embodiment is shown in FIG. 7. In the figure, designated at 20 is an indoor heat exchanger unit, 4 an indoor heat exchanger, 9' a blower, 21 are air deflecting plates at the bottom outlet, 22 movable air deflecting plates at the side outlet, A is inlet air, A1 outlet air from the side outlet, A2 outlet air from the bottom outlet, G a wall of the room, I a comfortable space during the hot air blowing mode, and II is a comfortable space during the normal mode.

In this embodiment, during the hot air blowing mode (mode A), the air deflecting plates 22 at the side outlet are closed and only the air deflecting plates 21 at the bottom outlet are opened to thereby restrict the outlet air to A2 only. Accordingly, hot air can reach space I even at lower room temperatures so that the occupants may feel comfortable.

When the room temperature is above a certain level, the air conditioner is run in the normal mode (mode B) in which the air deflecting plates 22 at the side outlet are also opened to permit hot air to be blown obliquely downward. In this state, space II, the entire room, becomes comfortable.

Hereinafter a practical example of the hot air blowing mode will be described and the present invention will be explained in more detail.

Figure 8:
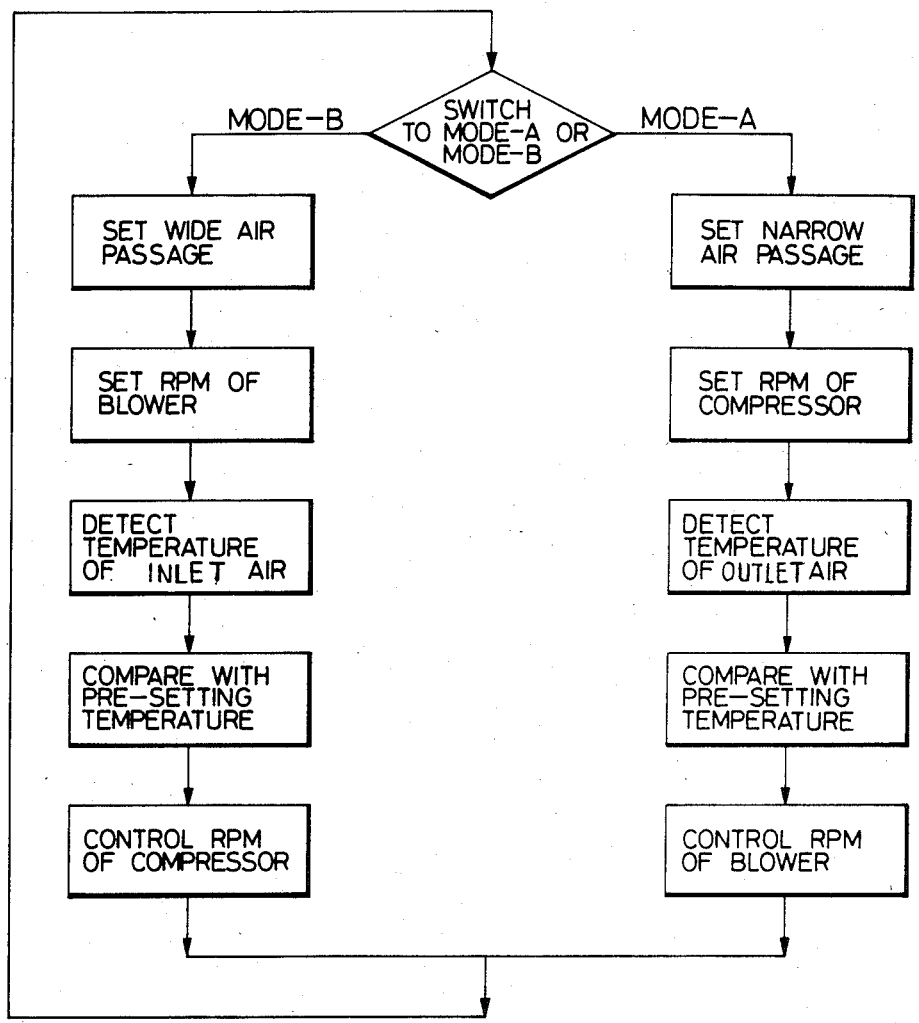
FIG. 8 is a flowchart showing the control process of the embodiment shown in FIG. 6.

FIG. 8 is a flowchart showing one embodiment of the operation of the air conditioner constructed as shown in FIGS. 6 and 7. When it starts to operate, the switching means 102 is set to the desired mode. With mode A set, the arithmetic unit 100 sets the air passage of the outlet to be narrow. Stated differently, the arithmetic unit 100 orders the side outlet 22 in this embodiment to close. Next, the r.p.m. of the compressor is set at the maximum value and it is decided whether or not the outlet air temperature detected by the sensor 14 has reached the preset temperature. If it has not reached the preset temperature, the r.p.m. of the blower 9 is decreased and, if it has already reached the presetting temperature, the r.p.m. of the blower 9 is increased. Namely, the r.p.m. of the blower is controlled by the rpm changing means 101 so that the outlet air temperature becomes equal to the preset value.

After the air temperature has been adjusted to a comfortable level in this way, the mode is switched from A to B manually or automatically as will be described later.

Conversely, if the mode is set at B at the start of air conditioning, the r.p.m. of the compressor is controlled by the arithmetic unit 100 and the rpm changing means 101 to send instructions to set the air passage wide, i.e., open the side outlet 22 in this embodiment, while holding the r.p.m. of the blower at the maximum value, so that the temperature detected by the sensor 11 which detects the temperature of air flowing into the heat exchanger 4 is made to be equal to the value preset by the setting unit 12.

The detailed operations of both compressor and blower in this embodiment are basically similar to those (as shown in FIG. 5) in the embodiment of FIG. 2; description thereof will be omitted.

Figure 9:
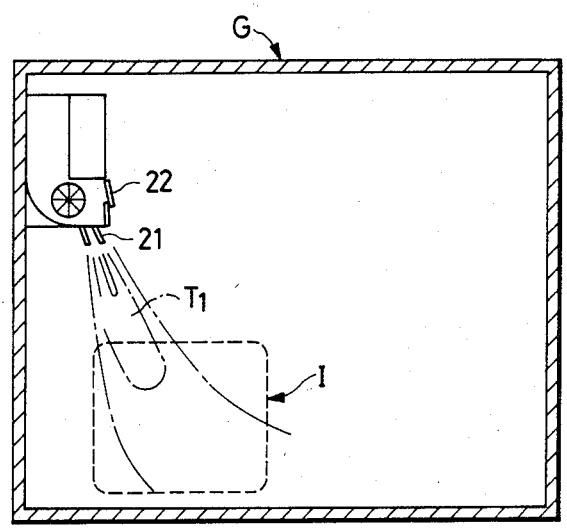
FIG. 9 is a view showing temperature distribution during the hot air blowing mode.
Figure 10:
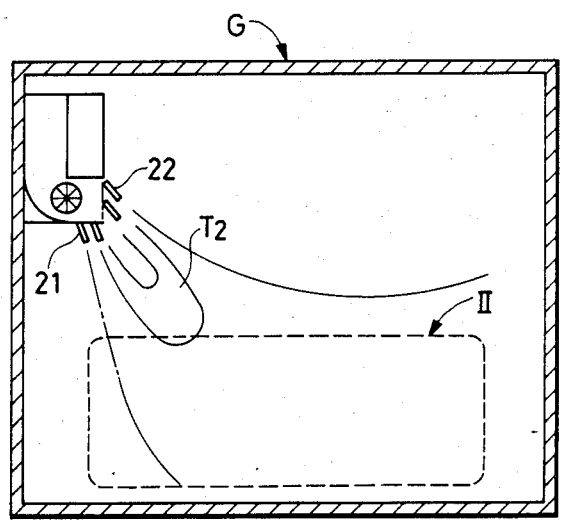
FIG. 10 is a view showing temperature distribution during normal operation.

Temperature profiles in the room during modes A and B are shown in FIGS. 9 and 10, respectively. In these figures, T1 and T2 represent isotherms. FIG. 9 corresponds to mode A in which only the bottom outlet 21 is opened, allowing hotter air to be blown straight down, thus resulting in the temperature profile of T1. Accordingly, space I becomes comfortable even though the average temperature for the entire room G is low. Meanwhile, FIG. 10 corresponds to mode B in which the side outlet 22 is also opened allowing hot air to be uniformly blown over a range from straight down to obliquely down, resulting in the temperature profile of T2. Accordingly, space II, the entire room G, becomes comfortable.

As described hereinabove, since this embodiment blows hot air to heat a restricted area during the time in which the room temperature Ta and the wall temperature Tw are both low and the heating load is large, and controls room temperature to spread heat when the room and wall temperatures have been increased and the heating load has become small, the room is quickly made comfortable for the occupants and this condition is maintained.

Although the above description refers to mode A and B being switched manually, this switching can be automated by detecting the air conditioning load. We will now describe control for switching modes automatically. The embodiment in this example is constructed on the basis of the embodiment shown in FIG. 6, but the present invention can also be modified on the basis of the embodiment shown in FIG. 2.

Figure 11:
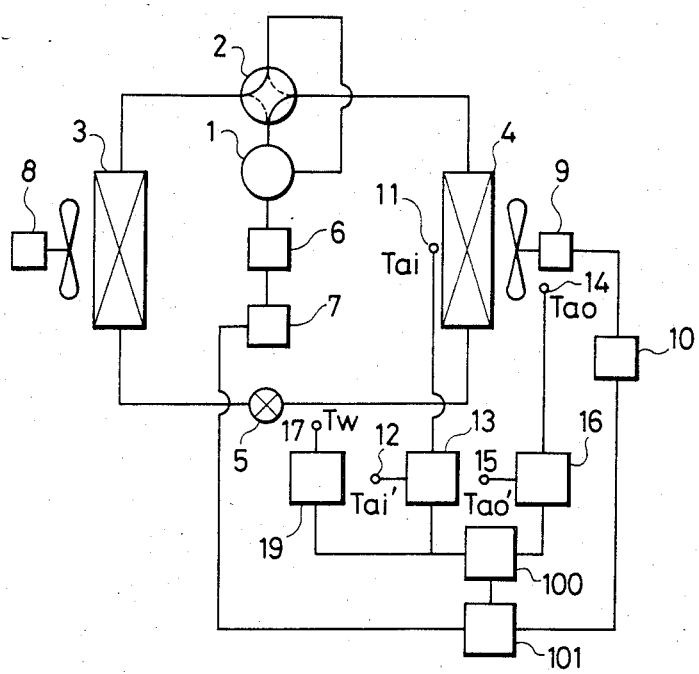
FIG. 11 is a block diagram showing the schematic diagram of an apparatus according to an embodiment in which the mode switching means of the present invention is actuated in accordance with wall temperature expressed as a function of room temperature.
Figure 12:
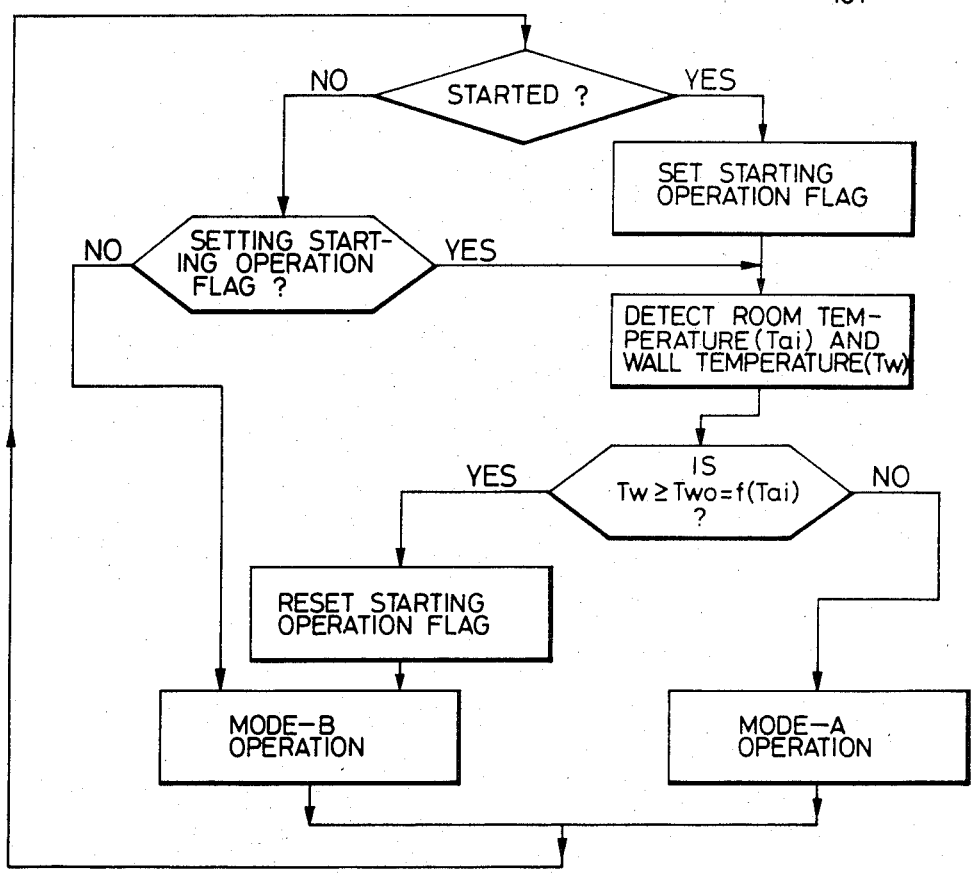
FIG. 12 is a flowchart showing the control process of the embodiment shown in FIG. 11.

FIG. 11 is a block diagram of an air conditioner in one embodiment of automatic switching, and FIG. 12 is a flowchart showing the operation thereof. In FIG. 11, designated at 17 is means for detecting the wall temperature and 19 is a comparator for comparing the temperature detected by the detecting means 17 with the preset wall temperature to be described later. The wall temperature is detected by sensors attached to the wall surface. It is the average value of temperatures detected on the four walls. The operation of this embodiment will now be described.

When the arithmetic unit 100 detects the start of the air conditioner, the arithmetic unit sets a flag to identify the start, then detects the room temperature Tai with the room temperature detecting means 11 and detects the wall temperature Tw with the wall temperature detecting means 17. The arithmetic unit 100 has stored therein the characteristic data indicated by the comfort curve of FIG. 3. A comfortable wall temperature Two is given by the following equation:

Two=f (Tai)

Where f (Tai) is the function of Tai obtainable from the characteristic curve of FIG. 3, for example.

The comparator 19 compares Tw with Two. If Tw<Two, the arithmetic unit 100 sets mode A. If Tw≧Two, the arithmetic unit 100 resets the starting operation flag and sets mode B.

During operation, if the starting operation flag is set, mode A is effected through a similar process following detection of the room temperature Ta1 and the wall temperature Tw. After the starting operation flag has been reset, mode B is set.

This embodiment makes it possible to select the mode that will make the room most comfortable for the occupants.

Figure 13:
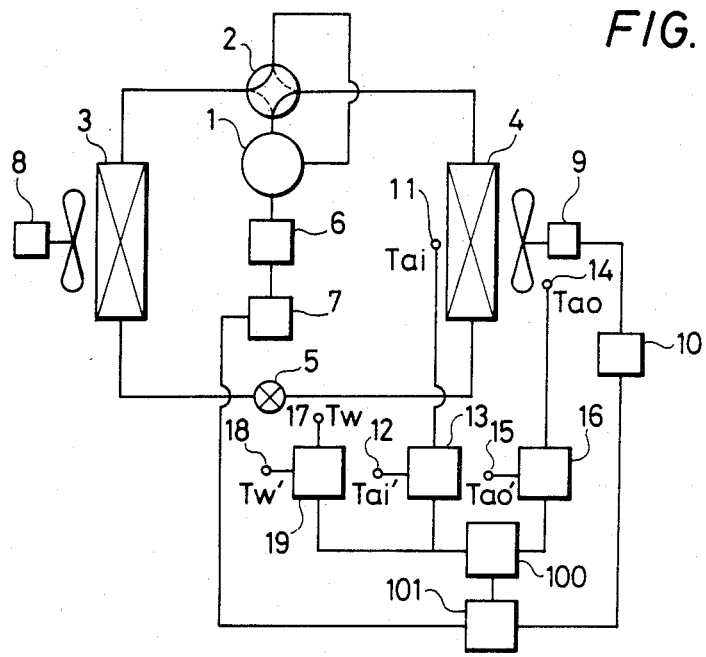
FIG. 13 is a block diagram showing the schematic diagram of an apparatus according to an embodiment in which the mode switching means of the present invention is actuated in accordance with the wall temperature.
Figure 14:
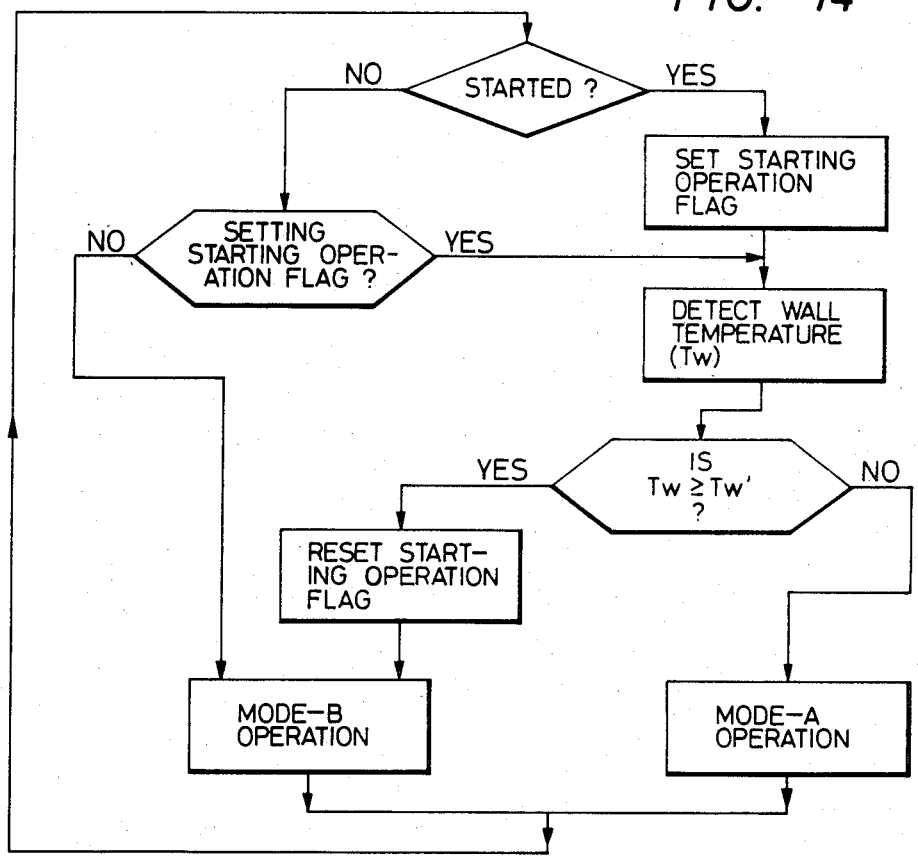
FIG. 14 is a flowchart showing the control process of the embodiment shown in FIG. 13.

FIG. 13 shows a block diagram of an air conditioner in another embodiment of automatic mode switching, and FIG. 14 is a flowchart showing the operation thereof. In FIG. 13, designated at 18 is a unit for setting wall temperature. This embodiment is different from the embodiment, shown in FIG. 11, in that the mode switching method is based on the preset value of wall temperature in the former. The operation of this embodiment will now be described.

When it detects start up of the air conditioner, the arithmetic unit 100 sets a starting operation flag and then detects the wall temperature Tw with the wall temperature detecting means 17. Meanwhile, a setting wall temperature Tw' is preset by the setting unit 18. The comparator 19 compares Tw with Tw'. If Tw<Tw', the arithmetic unit 100 sets mode A. If Tw≧Tw', the arithmetic unit 100 resets the starting operation flag and sets mode B.

During the operation, if the starting operation flag is set, a similar process following detection of the wall temperature Tw is repeated to effect mode A. After the starting operation flag has been reset, mode B is set.

This embodiment makes it possible to switch modes more simply than with the embodiment shown in FIG. 11.

Figure 15:
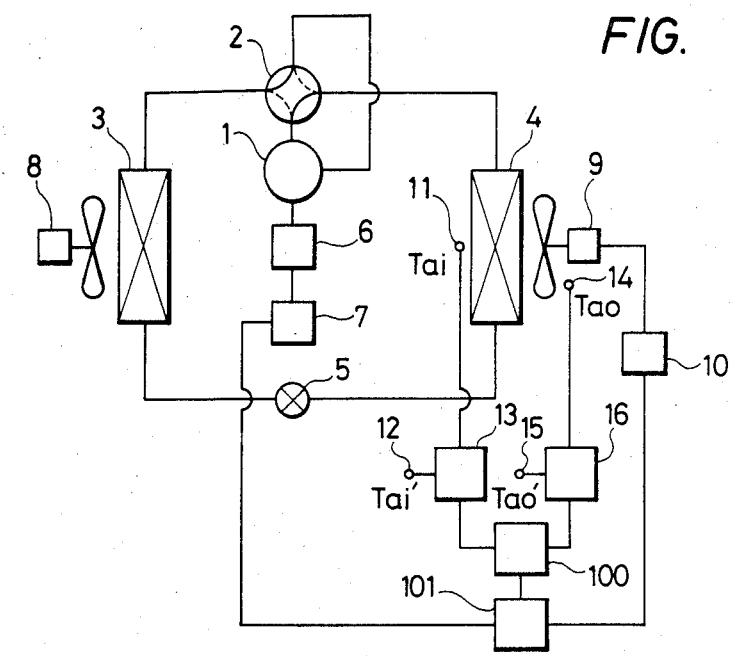
FIG. 15 is a block diagram showing the schematic diagram of an apparatus according to an embodiment in which the mode switching means of the present invention is actuated in accordance with the room temperature.
Figure 16:
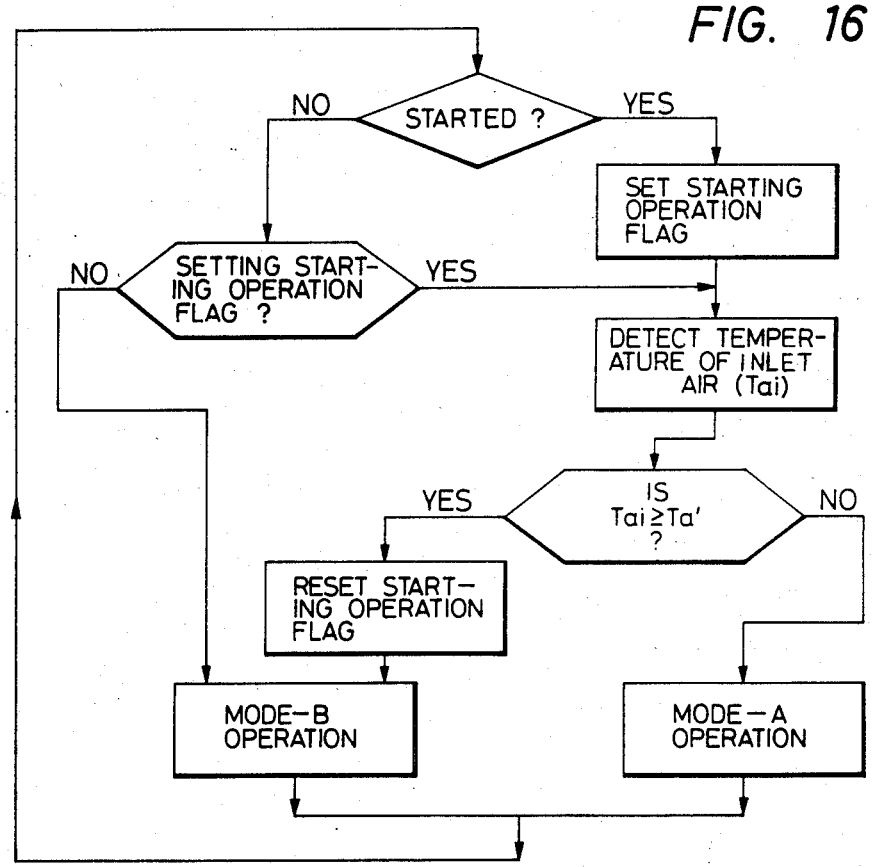
FIG. 16 is a flowchart showing the control process of the embodiment shown in FIG. 15.

FIG. 15 shows a block diagram of an air conditioner according to another embodiment of automatic mode switching, and FIG. 16 is a flowchart showing the operation thereof. This embodiment is different from the embodiment, shown in FIG. 11, in that mode switching is based on the present value of room temperature in the former. The operation of this embodiment will now be described.

When it detects start up of the air conditioner, the arithmetic unit 100 sets a starting operation flag, then detects the room temperature Tai with the room temperature detecting means 11. Meanwhile, a setting room temperature Tai' is preset by the setting unit 12. The comparator 13 compares Tai with Tai'. If Tai<Tai', the arithmetic unit 100 sets mode A. If Tai≧Tai', the arithmetic unit 100 resets the starting operation flag and sets mode B.

During the operation, if the starting operation flag is set, a similar process following detection of the room temperature Tai is repeated to effect mode A. After the starting operation flag has been reset, mode B is set.

This embodiment makes it possible to switch modes with the room temperature detecting means which has been already employed in control of the prior art air conditioner.

Although specific embodiments of the present invention were disclosed in the above, other embodiments may be obtainable which ensure stable operation with a relatively simple circuit between modes A and B with a timer in which the correct period of time has been preset.

As will be apparent from the foregoing description, the present invention produces a limited comfortable space by controlling the temperature of outlet air blown from the air conditioner into the room and allowing hot air to be blown onto a restricted area when the heating load is large, and to make the entire room comfortable by controlling room temperature and allowing hot air to be uniformly distributed when the heating load is relatively small, thereby producing comfortable circumstances for the occupants of the room. Thus, there can be also obtained a valuable effect that heat pumps become usable even in very cold areas where application thereof has been practically difficult heretofore.

What is claimed is:

1. A control method for an air conditioner using a heat pump, having; a compressor; a variable speed electric motor for driving said compressor; a four-way valve; an expansion device; an outdoor heat exchanger; an indoor heat exchanger; and a variable speed blower for said indoor heat exchanger, comprising the steps of; detecting the temperature of inlet air drawn into said indoor heat exchanger; presetting the desired temperature value of said inlet air; detecting the temperature of outlet air blown from said indoor heat exchanger; presetting the desired higher temperature value of said outlet air temperature;

switching modes between:
the normal mode in which the r.p.m. of said compressor is controlled so that the temperature of said inlet air is made equal to the preset value, and
the hot air blowing mode in which the r.p.m. of said blower for said indoor heat exchanger is controlled while keeping the r.p.m. of said compressor high so that said outlet air temperature is made equal to the preset higher temperature value thereof,
said mode switching being dependent upon the degree of comfort based on the temperature in a room to be air conditioned.

2. A control method according to claim 1, wherein said mode switching includes mode switching for selecting the normal mode when the room to be air conditioned is comfortable and the hot air blowing mode when it is uncomfortable, said mode switching being selective.

3. A control method according to claim 1, wherein said detecting includes detecting the temperature in the room Tai to be air conditioned and detecting the temperature of wall Tw inside the room; and
wherein, when the desired wall temperature Two representing comfort in the room is obtained from the following equation:

ti $Two = f(Tai)$;

where $f(Tai)$ is a function of Tai, the modes are switched by comparing Two with the actual wall temperature Tw measured by said wall temperature detecting, then blowing hot air if $Tw < Two$, and operating normally if $Tw \geq Two$.

4. A control method according to claim 1, wherein said detecting includes detecting the temperature of wall Tw inside the room to be air conditioned and presetting the desired value Tw' of the wall temperature inside the room; and
wherein the operation modes are switched by comparing wall temperature Tw measured by said wall temperature detecting with the setting value Tw' thereof, then blowing hot air if $Tw < Tw'$, and operating normally if $Tw \geq Tw'$.

5. A control method for an air conditioner using a heat pump having; a compressor; a variable speed electric motor for driving said compressor; a four-way valve; an expansion device; an outdoor heat exchanger; an indoor heat exchanger; a variable speed blower for said indoor heat exchanger; and means for varying an air passage of an outlet of said indoor heat exchanger, comprising the steps of; detecting the temperature of inlet air drawn into said indoor heat exchanger and presetting the desired temperature of said outlet air;
detecting the temperature of outlet air blown from said indoor heat exchanger and presetting the desired higher temperature value of said outlet air temperature;
switching modes between:
the normal mode in which the r.p.m. of said compressor is controlled so that said inlet air temperature is made equal to the preset value, and
the hot air blowing mode in which the r.p.m. of said blower for said indoor heat exchanger is controlled while keeping high the r.p.m. of said compressor so that said outlet air temperature is made equal to the preset higher temperature value thereof,
said operation mode switching being selected according to the degree of comfort based on the temperature in a room to be air conditioned; and varying said air passage to set that of said outlet to narrow, thereby blowing hot air over a restricted area in the hot air blowing mode, and to set the air passage of said outlet to wide to thereby disperse warm air throughout the room during normal operation.

6. A control method according to claim 5, wherein said mode switching includes mode switching for selecting the normal mode when the room to be air conditioned is comfortable and the hot air blowing operation mode when it is uncomfortable, said mode switching being selective.

7. A control method according to claim 5, wherein said detecting includes detecting the temperature in the room Tai to be air conditioned and detecting the temperature of wall Tw inside the room; and
wherein, when the desired wall temperature Two representing comfort in the room is obtained from the following equation:

$Two = f(Tai)$;

where $f(Tai)$ is a function of Tai, the operation modes are switched over by comparing Two with the actual wall temperature Tw measured by said wall temperature detecting, then blowing hot air if $Tw < Two$ and normal operation if $Tw \geq Two$.

8. A control method as in claim 5, wherein said detecting includes detecting the temperature of wall Tw inside the room to be air conditioned and presetting the desired value Tw' of the wall temperature inside the room; and
wherein the modes are switched by comparing the wall temperature Tw measured by said wall temperature detecting with the setting value Tw' thereof, then blowing hot air is $Tw < Tw'$ and normal operation if $Tw \geq Tw'$.

9. A control apparatus for an air conditioner using a heat pump, comprising; a compressor; a variable speed electric motor for driving said compressor; a four-way valve; an expansion device; an outdoor heat exchanger; an indoor heat exchanger; a variable speed blower for said indoor heat exchanger; means for detecting the temperature of inlet air drawn into said indoor heat exchanger and means for presetting the desired temperature value of said inlet air; and means for detecting the temperature of outlet air blown from said indoor heat exchanger and means for presetting the desired higher temperature value of said outlet air temperature;
means for switching modes between:
the normal mode in which the r.p.m. of said compressor is controlled so that the temperature of said inlet air is made equal to the preset value, and
the hot air blowing mode in which the r.p.m. of said blower for said indoor heat exchanger is controlled while keeping the r.p.m. of said compressor high so that said outlet air temperature is made equal to the preset higher temperature value thereof;
means for detecting the temperature in the room Tai to be air conditioned and means for detecting the temperature of wall Tw inside the room; and
wherein, when the desired wall temperature Two representing comfort in the room is obtained from the following equation:

$$T_{wo} = f(T_{ai});$$

where f (Tai) is a function of Tai, the modes are switched by comparing Two with the actual wall temperature Tw measured by said wall temperature detecting means, then blowing hot air if Tw<Two, and operating normally if Tw≧Two.

10. A control apparatus according to claim 9, wherein said air conditioner further including means for varying an air passage of an outlet of said indoor heat exchanger, and said air passage varying means being controlled to set the air passage of said outlet to narrow, thereby blowing hot air over a restricted area in the hot air blowing mode, and to set the air passage of said outlet to wide to thereby disperse warm air throughout the room during normal operation.

11. A control apparatus for an air conditioner using a heat pump, comprising; a compressor; a variable speed electric motor for driving said compressor; a four-way valve; an expansion device; an outdoor heat exchanger; an indoor heat exchanger; a variable speed blower for said indoor heat exchanger; means for detecting the temperature of inlet air drawn into said indoor heat exchanger and means for presetting the desired temperature value of said inlet air; and means for detecting the temperature of outlet air blown from said indoor heat exchanger and means for presetting the desired higher temperature value of said outlet air temperature;

means for switching modes between:
the normal mode in which the r.p.m. of said compressor is controlled so that the temperature of said inlet air is made equal to the preset value, and
the hot air blowing mode in which the r.p.m. of said blower said indoor heat exchanger is controlled while keeping the r.p.m. of said compressor high so that said outlet air temperature is made equal to the preset higher temperature value thereof;
means for detecting the temperature of wall Tw inside the room to be air conditioned and means for presetting the desired value Tw' of the wall temperature inside the room; and
wherein the operation modes are switched by comparing wall temperature Tw measured by said wall temperature detecting means with the setting value Tw' thereof, then blowing hot air if Tw<Tw', and operating normally if Tw≧Tw'.

12. A control apparatus, according to claim 11, wherein said air conditioner further including means for varying an air passage of an outlet of said indoor heat exchanger, and said air passage varying means being controlled to set the air passage of said outlet to narrow, thereby blowing hot air over a restricted area in the hot air blowing mode, and to set the air passage of said outlet to wide to thereby disperse warm air throughout the room during normal operation.

* * * * *